March 5, 1935.    B. J. HASKINS    1,993,444
STARTING MOTOR AND BATTERY CIRCUIT ANALYZER
Filed Dec. 23, 1933
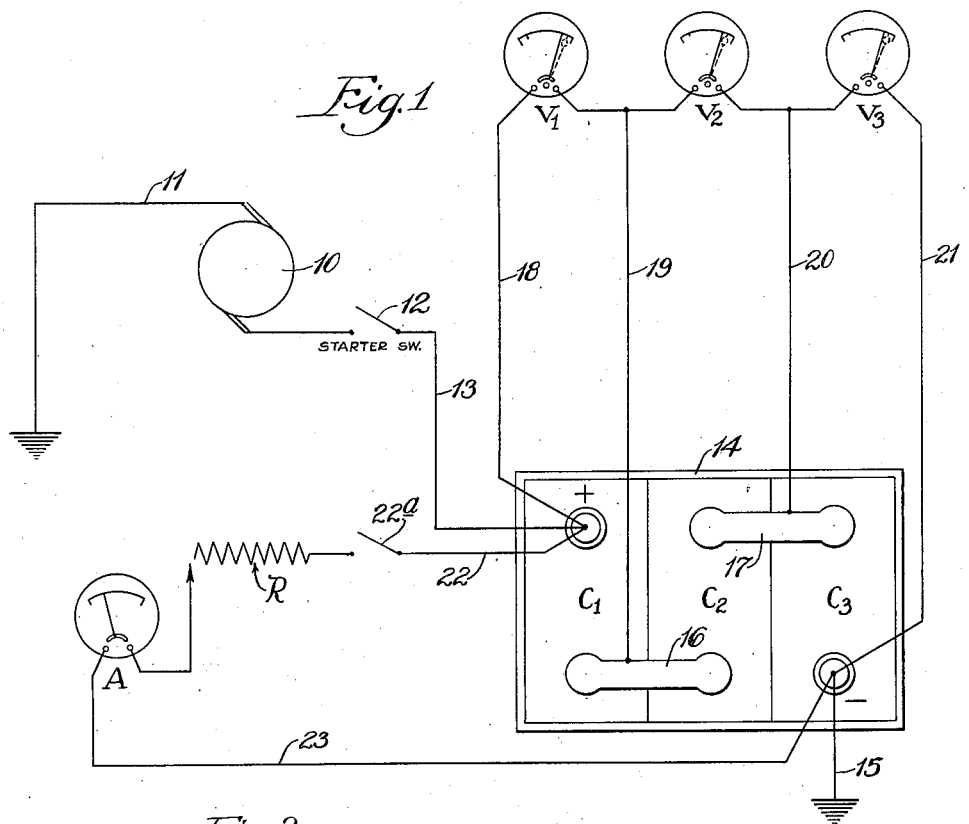
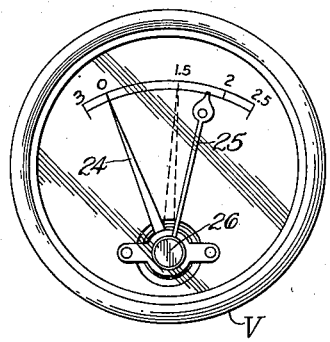
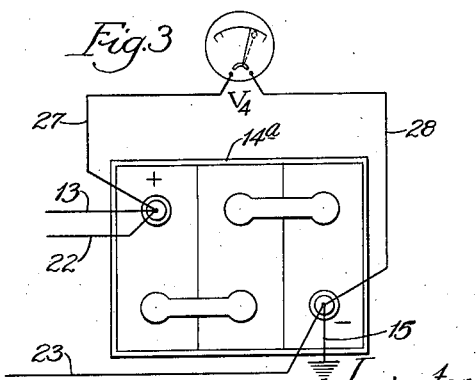
Inventor:
Butler J. Haskins,
By Banning & Banning
Attys.

Patented Mar. 5, 1935

1,993,444

UNITED STATES PATENT OFFICE 1,993,444

STARTING MOTOR AND BATTERY CIRCUIT ANALYZER

Butler J. Haskins, Chicago, Ill., assignor to Joseph Weidenhoff, Inc., Chicago, Ill., a corporation of Illinois Application December 23, 1933, Serial No. 703,717

4 Claims. (Cl. 175—183)

This invention relates to apparatus for analyzing the starting motor and battery circuit of automobiles.

An object of the invention is to provide means for measuring the resistance of the starting motor while it is cranking the engine.

Another object is to provide means for checking the condition of each cell of the storage battery while the engine is being cranked by the starting motor using the car battery.

Another object is to provide means for analyzing the motor, battery, and their connections under actual operative conditions and without disturbing them in any way.

These and other objects, as will hereinafter appear, are accomplished by this invention which is fully described in the following specification and shown in the accompanying drawing, in which—

Figure 1 is a wiring diagram of an automobile starting motor and battery circuit with my invention applied thereto;

Fig. 2 is an enlarged front elevation of one of the three voltmeters shown in Fig. 1; and Fig. 3 shows a modified form of Fig. 1 in which a single voltmeter replaces the three voltmeters of Fig. 1.

The embodiment illustrated in Fig. 1 comprises an automobile starting motor 10 connected at one side to ground through a lead 11, and at the other through a starter switch 12 and lead 13 to one terminal of a storage battery 14, while the opposite terminal of the battery is carried to ground through a lead 15. The foregoing apparatus is part of the permanent automobile installation and is not described in any way, so that tests hereafter to be made show the actual conditions as they exist in the automobile starting motor and battery circuit.

The automobile storage battery 14 consists of three cells $C_1$, $C_2$, $C_3$ connected in a well known manner by means of leads 16, 17. Three voltmeters $V_1$, $V_2$, $V_3$ are adapted to be connected to the three cells $C_1$, $C_2$, $C_3$, respectively, by means of leads 18, 19, 20, 21 which terminate in spring clamps by means of which they are electrically connected to the two terminals of the battery and to the leads 16, 17. An ammeter A and a variable resistance or rheostat R in series therewith is connected through a lead 22 and switch $22^a$ with the positive terminal of the battery, and through a lead 23 with the negative terminal of the battery. This resistance is normally open, as shown, so that no current flows through the ammeter. The resistance is preferably closed and adjusted only after closing the switch $22^a$ and during the time it is desired that current should flow through the ammeter. The leads 22, 23 are quite heavy, enabling them to carry current of high amperage, and these leads likewise terminate in heavy spring clamps by means of which they make electrical contact with the terminals of the battery.

Each voltmeter has a pointer 24 operating over a graduated scale, and each is preferably provided with an adjustable hand 25 which is operable by means of a knob 26, so that it can be set at any desired point on the scale. With the parts connected, as shown in Fig. 1, the operator closes the starter switch 12 without, however, turning on the engine ignition. The motor 10 thereupon begins to crank the engine, not shown, and as it continues to do so the heavy current draw of the motor, amounting as it often does to 300 to 400 amperes, causes an appreciable drop in the voltage of each cell of the storage battery. The adjustable hands 25 of several voltmeters $V_1$, $V_2$, $V_3$ may then be set to correspond to the reading of its pointer 24 with the motor thus in operation. With these hands thus set the starter switch 12 is opened and the cranking ceases.

The switch $22^a$ is then closed and the variable resistance R adjusted until the readings of the several voltmeters $V_1$, $V_2$, $V_3$ are the same as those previously observed with the motor in operation. The same readings on the voltmeters thus indicate that the current draw through the resistance R is now the same as the current draw through the motor 10 while cranking the engine. This current can now be measured by reading the ammeter A. While the several voltmeters are preferably provided with adjustable hands 25, these may be dispensed with, if desired, and the positions of the pointers 24 read on their scales and noted.

If the three cells of the storage battery are substantially the same size, have substantially the same characteristics, and are in about the same condition, the three voltmeters should read substantially the same. If, however, one of the cells is defective, or if it is not charged to the same degree as the others it may show a lower voltage. Thus a comparison of the readings of the three cells may give an indication of the condition of the several cells of the storage battery. At the very instant of closing the switch $22^a$ and before the motor has started, the current draw will be very much heavier than that at normal cranking speed. The current draw at this instant may be determined in the same way as that provided for determining the current draw during the normal cranking operation. To do this it will be necessary to note the positions of the pointers of the three voltmeters just at the instant of closing the starting switch and before the motor has started. By adjusting the resistance R so as to cause the pointers of these voltmeters to assume these same positions it is possible to read on the ammeter A the amount of current necessary to just start cranking the engine. This test will also show up even more clearly any defect which might be present in any cell of the battery.

For certain purposes it may not be desirable or necessary to read the voltage of each individual cell. It may be sufficient to read instead the voltage of the storage battery as a whole. For this purpose a single voltmeter V4 (Fig. 3) may be connected across the terminals of the battery 14a by means of leads 27, 28. The other leads will remain as before, and the operation is the same both for starting and for starting and for cranking tests as those previously described, except that we now have one voltmeter to observe instead of three.

The voltmeters and the ammeter and its variable resistance are preferably mounted on a wheeled stand which can be rolled up to an automobile to be tested, and this carries suitable flexible connecting leads 18 to 23 inclusive with their spring clamps, or other suitable connections, for attachment to the storage battery as described.

Too high a current draw indicates bad bearings or misalignment, a short circuit in the motor field or armature, too tight engine bearings, pistons, starter gears, etc. On the other hand, too little current draw, assuming that a proper battery voltage of 1.5 volts or better is maintained, indicates defective cables, terminals or brushes, or dirty commutator, bad ground connections, etc.

Thus a means is provided for testing the starting motor and its storage battery and their connections under its actual operative conditions as they exist in the automobile and without disturbing them in any way.

While I have shown and described but a few embodiments of my invention, it is to be understood that it is capable of many modifications. Changes, therefore, in the construction and arrangement may be made which do not depart from the spirit and scope of the invention as covered by the appended claims.

I claim:

1. The method of testing an automobile starting motor and its storage battery having a plurality of cells comprising cranking the engine by the storage battery and starting motor with the ignition off, simultaneously observing the voltage of each cell of the storage battery while the engine is being thus cranked, shorting the terminals of the storage battery through a variable resistance, varying that resistance until the said voltmeters have substantially the same readings as previously observed, and reading the strength of the current flowing through said resistance.

2. The method of testing an automobile starting motor and its storage battery having a plurality of cells comprising connecting a voltmeter across the terminals of each cell of the storage battery, cranking the engine by the storage battery and starting motor with the ignition off, simultaneously observing the voltage of each cell of the storage battery while the engine is being thus cranked, shorting the terminals of the storage battery through a variable resistance, varying that resistance until the said voltmeters have substantially the same readings as previously observed, and reading the strength of the current flowing through said resistance.

3. The method of testing an automobile starting motor and its storage battery having a plurality of cells comprising connecting a voltmeter across the terminals of each cell of the storage battery, cranking the engine by the storage battery and starting motor with the ignition off, simultaneously observing the voltage of each cell of the storage battery at the instant of starting and before the motor has attained cranking speed, shorting the terminals of the storage battery through a variable resistance, varying that resistance until the said voltmeters have substantially the same readings as previously observed, reading the strength of the current flowing, and comparing the voltages of the several cells as an indication of the condition of each of said cells.

4. The method of testing an automobile starting motor and its storage battery comprising cranking the engine by the storage battery and starting motor with the ignition off, simultaneously observing the voltage of the storage battery while the engine is being thus cranked, shorting the terminals of the storage battery through a variable resistance until the voltage of the storage battery is substantially the same as that observed while the engine was being cranked, and reading the strength of the current flowing through said resistance.

BUTLER J. HASKINS.